US011429867B2

(12) United States Patent
Bonakdar Sakhi

(10) Patent No.: US 11,429,867 B2
(45) Date of Patent: Aug. 30, 2022

(54) DOWN-SAMPLING FOR CONVOLUTIONAL NEURAL NETWORKS

(71) Applicant: INTERNATIONAL BUSINESS MACHINES CORPORATION, Armonk, NY (US)

(72) Inventor: Omid Bonakdar Sakhi, North York (CA)

(73) Assignee: International Business Machines Corporation, Armonk, NY (US)

(*) Notice: Subject to any disclaimer, the term of this patent is extended or adjusted under 35 U.S.C. 154(b) by 994 days.

(21) Appl. No.: 16/157,689

(22) Filed: Oct. 11, 2018

(65) Prior Publication Data

US 2020/0118002 A1 Apr. 16, 2020

(51) Int. Cl.
*G06N 3/08* (2006.01)

(52) U.S. Cl.
CPC ............. *G06N 3/088* (2013.01); *G06N 3/084* (2013.01)

(58) Field of Classification Search
CPC ................................ G06N 3/088; G06N 3/084
See application file for complete search history.

(56) References Cited

U.S. PATENT DOCUMENTS

| | | | | |
|---|---|---|---|---|
| 2017/0206434 A1* | 7/2017 | Nariyambut Murali | ..................... | G06K 9/628 |
| 2019/0325605 A1* | 10/2019 | Ye | ......................... | G06V 10/82 |
| 2020/0118002 A1* | 4/2020 | BonakdarSakhi | ..... | G06N 3/084 |
| 2020/0202173 A1* | 6/2020 | Oishi | .................... | G06T 1/0007 |

FOREIGN PATENT DOCUMENTS

| | | |
|---|---|---|
| CN | 103793917 A | 5/2014 |
| CN | 106980896 A | 7/2017 |
| WO | 2016132146 A1 | 8/2016 |
| WO | 2017152990 A1 | 9/2017 |

OTHER PUBLICATIONS

Gao etal, "Efficient and Invariant CNN for Dense Prediction", 2017, pp. 1-6 (Year: 2017).*

* cited by examiner

*Primary Examiner* — Paulinho E Smith
(74) *Attorney, Agent, or Firm* — Rakesh Roy

(57) ABSTRACT

A down-sampling operation for a convolutional neural network is provided. The present invention may include dividing received input to form a grid pattern having a set of odd and even numbered rows and columns and extracting data from each cell of the grid pattern to form a set of corresponding inputs. The present invention may include, in response to assigning data extracted from each cell to a corresponding channel, performing down-sampling of the extracted data for a respective channel associated with the input using an inverse of a first factor and increasing a number of the channels by a product of the first factor. The present invention may include adjusting a respective position of the received input by applying a transform to the data down-sampled to create transformed data. The present invention may include sending the transformed data as input to a next layer without addition or loss of data.

18 Claims, 9 Drawing Sheets ns recorded thereon, and any suitable combination of the foregoing.

DOWN-SAMPLING FOR CONVOLUTIONAL NEURAL NETWORKS

BACKGROUND

The present invention relates generally to the field of computing, and more particularly to computer processing of digital data comprising a grid pattern or array of numbers defining a set of tensors and using convolutional neural networks within a data processing system. More specifically, the present invention relates to computer processing of the digital data, or tensors, using a down-sampling technique in a convolutional neural network by the data processing system.

A typical technique of down-sampling used in convolutional neural networks includes down-sampling in a convolutional layer with a stride of two, and a max-pooling or an average pooling technique. Although a designer of a convolutional layer can arbitrarily pick a number of output channels, when applying these typical down-sampling techniques, a totality of channels remains the same for pooling techniques.

In all of these techniques, transferring information by the neural network from one side of a 2D tensor to the other side of the 2D tensor is difficult due to a limitation of the size of the kernels used. Therefore, more layers are needed to send information from one side of the array defined by the 2D tensor to the other side of the 2D tensor. Prior solutions using these techniques typically included modifications in the form of either increasing a depth of the network by adding more layers or re-encoding and decoding of the input or using a larger kernel size.

SUMMARY

Embodiments of the present invention disclose a method, computer system, and a computer program product for a down-sampling operation for a convolutional neural network. The present invention may include dividing received input to form a grid pattern having a set of odd and even numbered rows and columns. The present invention may include extracting data from each cell of the grid pattern to form a set of corresponding inputs. The present invention may include, in response to assigning data extracted from each cell to a corresponding channel, performing down-sampling of the extracted data for a respective channel associated with the input using an inverse of a first factor and increasing a number of the channels by a product of the first factor. The present invention may include adjusting a respective position of the received input by applying a transform selected from a group of transforms consisting of a flip transform, a mirror transform, and a rotation transform to the data down-sampled to create transformed data. The present invention may include sending the transformed data as input to a next layer without addition or loss of data.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
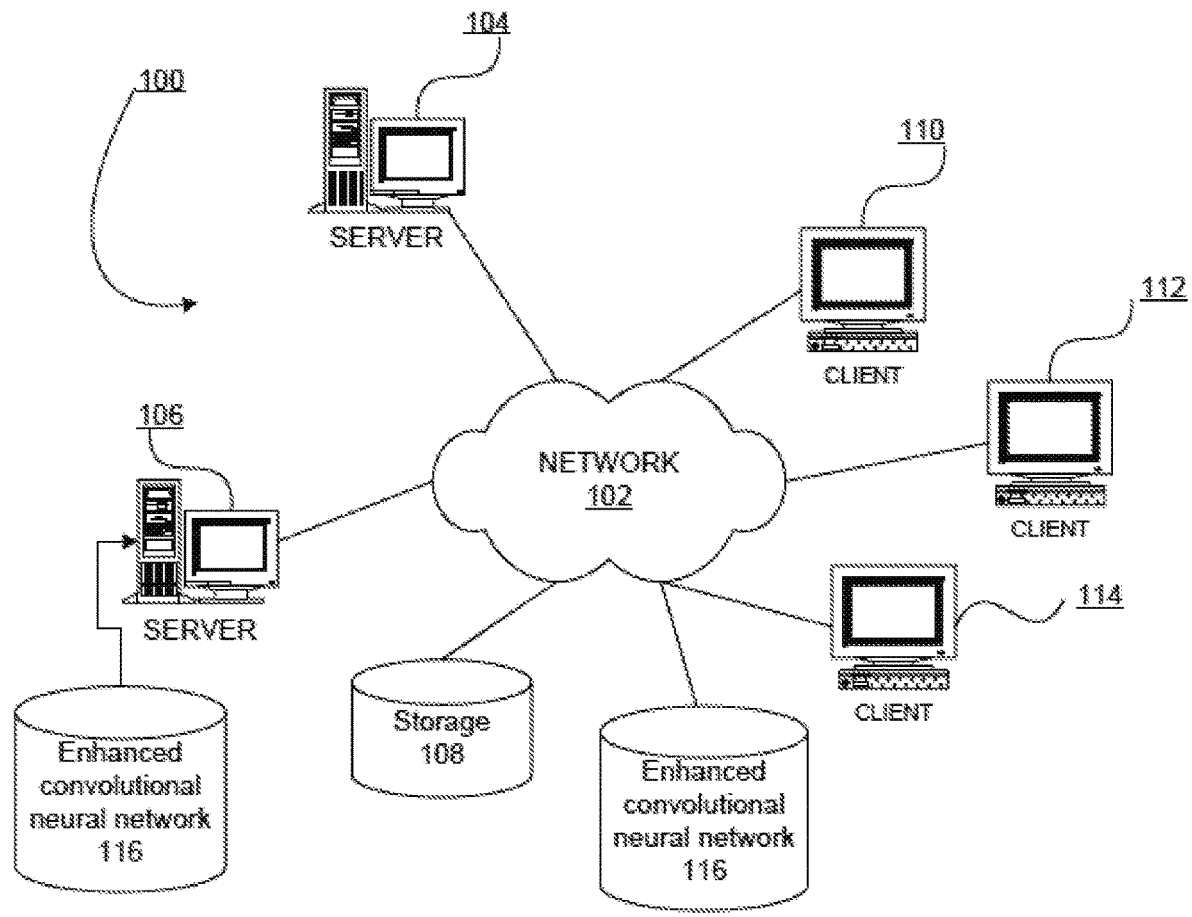
FIG. 1 illustrates a network data processing system according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, procedural programming languages, such as the "C" programming language or similar programming languages, and scripting programming languages including Python, or the like. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
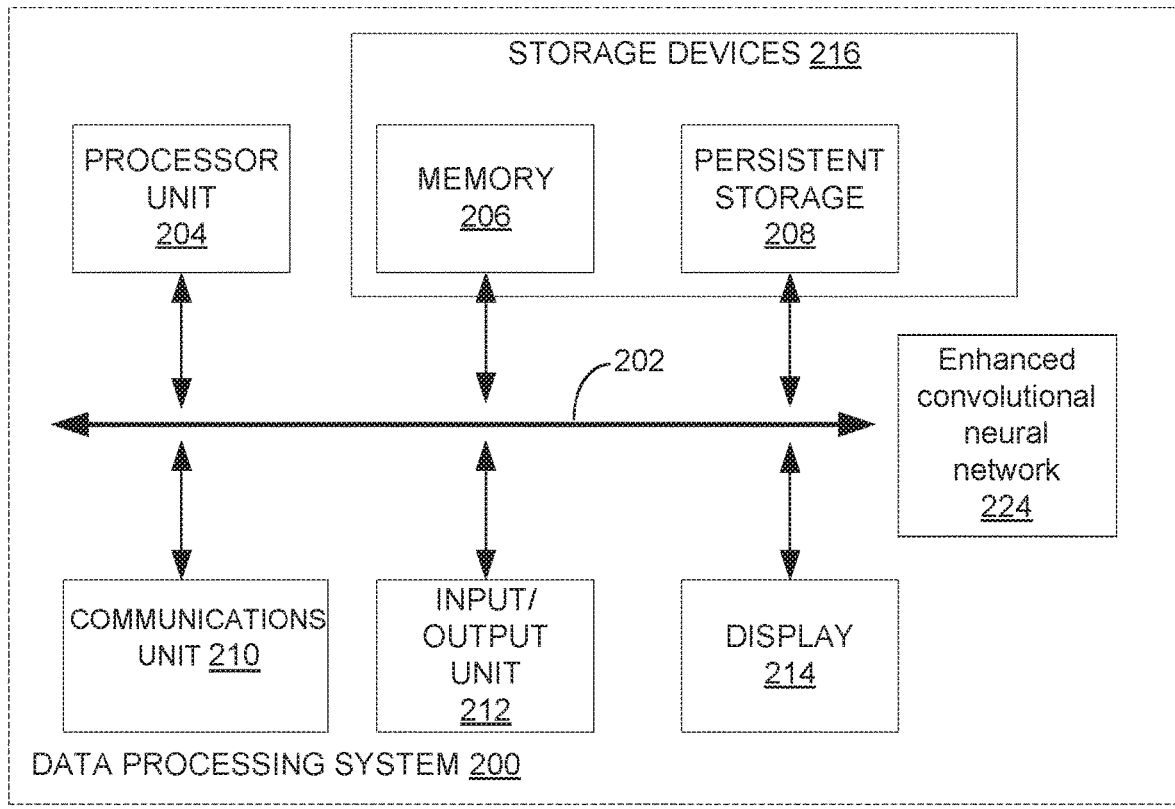
FIG. 2 is a block diagram of a data processing system in the network data processing system of FIG. 1 according to at least one embodiment.
Figure 2:
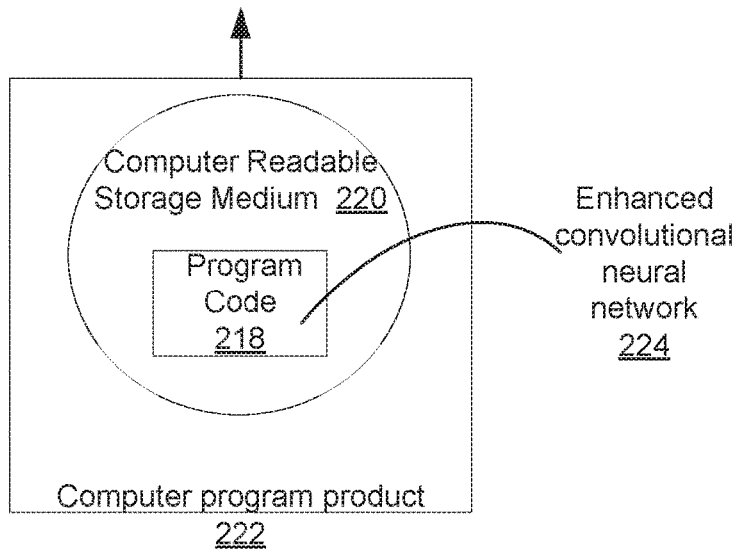

With reference now to the Figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing system in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, enhanced convolutional neural network 116 and applications to clients 110, 112, and 114. Clients 110, 112, and 114 are clients to server 104 in this example. In addition, enhanced convolutional neural network 116 may also be directly accessed using network 102. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, display 214 and enhanced convolutional neural network 224. Enhanced convolutional neural network 224 is a variant of enhanced convolutional neural network 116 of FIG. 1.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random-access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208. In another example, enhanced convolutional neural network 224 may also be contained within memory 206 or persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media or a computer readable data storage device. In some instances, computer readable storage media 220 may not be removable. In one example, program code 218 contains program code, which when executed, causes enhanced convolutional neural network 224 to be fully functional.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples.

In some illustrative embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The data processing system providing program code 218 may be a server computer, a client computer, or some other device capable of storing and transmitting program code 218.

The description, which follows, and the embodiments described therein, is provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

The following detailed description of the embodiments of the present invention does not limit the implementation of the present invention to any particular data processing system programming language. The present invention may be implemented in any data processing system programming language provided that the Operating System (OS) provides the facilities that may support the requirements of the embodiments of the present invention. Any limitations presented may be quite likely a result of a particular type of OS, data processing system programming language, or data processing system and may not be a limitation of the embodiment of the present invention.

Figure 3:
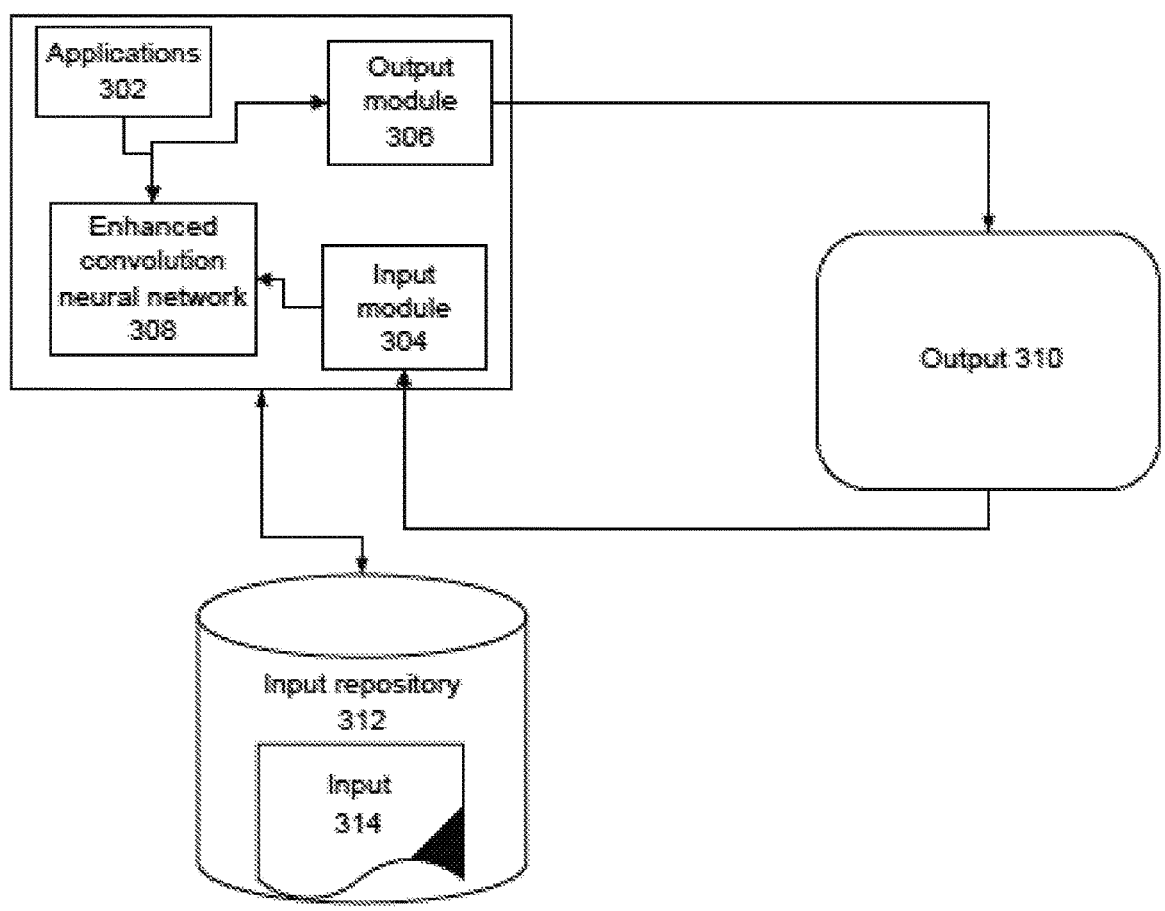
FIG. 3 is a block diagram representation of a data processing system including an enhanced convolutional neural network according to at least one embodiment.

With reference to FIG. 3 a block diagram representation of a data processing system including an enhanced convolutional neural network in an example of an embodiment of the disclosure is presented. Data processing system 300 is an embodiment of data processing system 200 of FIG. 2. Data processing system 300 comprises a number of components similar to those in data processing system 200 of FIG. 2 and including applications 302, input module 304, output module 306, enhanced convolutional neural network 308, output 310, input repository 312, and input 314.

In one embodiment of the disclosure, a multilayer convolutional neural network comprising multiple intermediate or hidden layers that perform feature extraction and classification, provides a foundation for enhanced convolutional neural network 308. Applications 302 are used to manage enhanced convolutional neural network 308 and edit parameters for controlling input and output of enhanced convolutional neural network 308. Enhanced convolutional neural network 308 arranges input 314 received from input repository 312 into a set of cells or segments forming a grid layout or array in a two-dimensional space.

Values in each in cell of the set of cells are used as input data into a set of one or more of the intermediate or hidden layers for extracting features from input 314. During operation of enhanced convolutional neural network 308, output from a first layer is fed into a subsequent layer, for example a pooling layer, which reduces dimensionality of the features previously extracted in the first layer, using a technique of down-sampling, while retaining most important information by typically using a max pooling technique. Feature extraction is therefore performed using output from a previous layer as input to a subsequent layer. This sequential process continues until all intermediate or hidden layers have been used.

Enhanced convolutional neural network 308 includes an enhanced operation to more quickly attain a desired outcome of the convolutional neural network processing. An embodiment of the disclosed method therefore, enables an immediate sending of information from one side of the 2D tensor. The immediacy of sending typically provides a capability of increasing power of the convolutional neural network while decreasing a need for additional layers. During the operation of enhanced convolutional neural network 308 no new data is added during the enhanced operation and no data is removed after the enhanced operation. This enhancement will be described in the following sections.

The process continues by performing additional operations including convolution and pooling operations, interspersed with one or more enhanced operations. The enhanced operation can be placed after a respective convolution operation or other operation and may also be stacked in a series of enhanced operations. An intermediate output generated from processing a 2D tensor in a first layer is fed into a successor step of processing in a second layer. This processing continues through a defined number of intermediate or hidden layers between an input layer and an output layer of enhanced convolutional neural network 308.

Output module 306 sends output 310 as a final output including features identified in input 314. Back-propagation is also used to adaptively modify the processing by feeding error correction information computed during forward processing of layers of enhanced convolutional neural network 308 backwards through layers of enhanced convolutional neural network 308.

Figure 4:
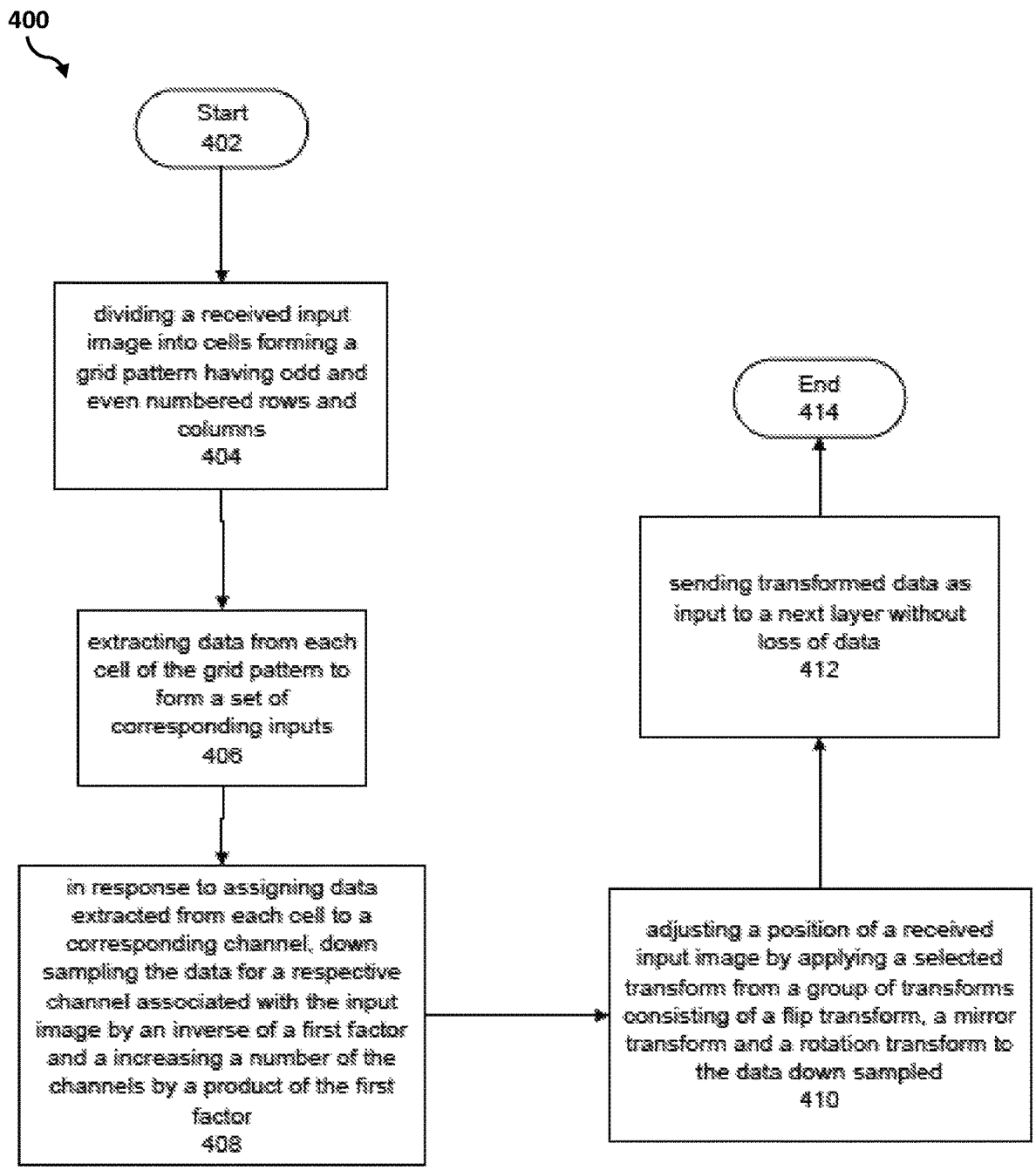
FIG. 4 is an operational flowchart illustrating a process for an enhanced convolutional neural network according to at least one embodiment.

FIG. 4 is a flow diagram of a process of an enhanced convolutional neural network operable for various embodiments of the disclosure. Process 400 is a high-level view of an example of processing digital data representing an input image using the enhanced convolutional neural network 308 of FIG. 3. However, this is only an example using digital image data and is not meant to limit the scope of the disclosure to the embodiment described. The disclosed technique, used with a 2D tensor representative of a digital image in this example, is therefore equally applicable to other two-dimensional data.

Process 400 begins at 402. At 404, the process 400 commences by dividing a received input image into cells or segments forming a grid pattern having odd and even numbered rows and columns. The grid pattern formed ensures uniform coverage of the input image using equal sized cells. The grid or array is further defined using a number of even numbered rows and odd numbered rows and even numbered columns and odd numbered columns. For example, the grid pattern may be numbered sequentially from left to right and top to bottom beginning at a top left position. Each cell in the grid has a respective numeric value associated with a respective digitized portion of the input image.

Process 400 continues at 406 by extracting data from each cell of the grid pattern to form a set of corresponding inputs. The set of corresponding inputs includes individual values of each cell.

Then at 408, in response to assigning the data extracted from each cell to a corresponding channel, process 400 performs down-sampling of the digital data for each respective channel associated with the input image by an inverse of a first factor and increasing a number of channels by a product of the first factor. This added sub-process of enhanced convolutional neural network 308 of FIG. 3 results in the size of the input image to be reduced while the number of channels is increased. However, during this operation of enhanced convolutional neural network 308 of FIG. 3 no new data is added during the enhanced operation and no data is removed after the enhanced operation.

Then at 410, process 400 continues by adjusting a position of a received input image by applying a selected transform from a group of transforms consisting of a flip transform, a mirror transform, and a rotation transform to the data down-sampled. Application of a selected transform rapidly changes positioning of the image relative to earlier prior techniques that gradually changed the data through a number of iterations using many gradients. However, the prior down-sampling methods typically did not change position of pixels of the image being processed. As a result, the only option typically available using the prior down-sampling methods is for the prior implemented convolutional neural network to shift pixels using only the convolutional filters. Filters of a next hidden layer of enhanced convolutional neural network 308 of FIG. 3 use this transformed data readily available to their benefit.

Next at 412, process 400 continues further by sending transformed data as input to a next layer without addition or loss of data with the process terminating thereafter at 414. Although the image is repositioned, there is no addition or loss of data using this described process of enhanced convolutional neural network 308 of FIG. 3.

Figure 5:
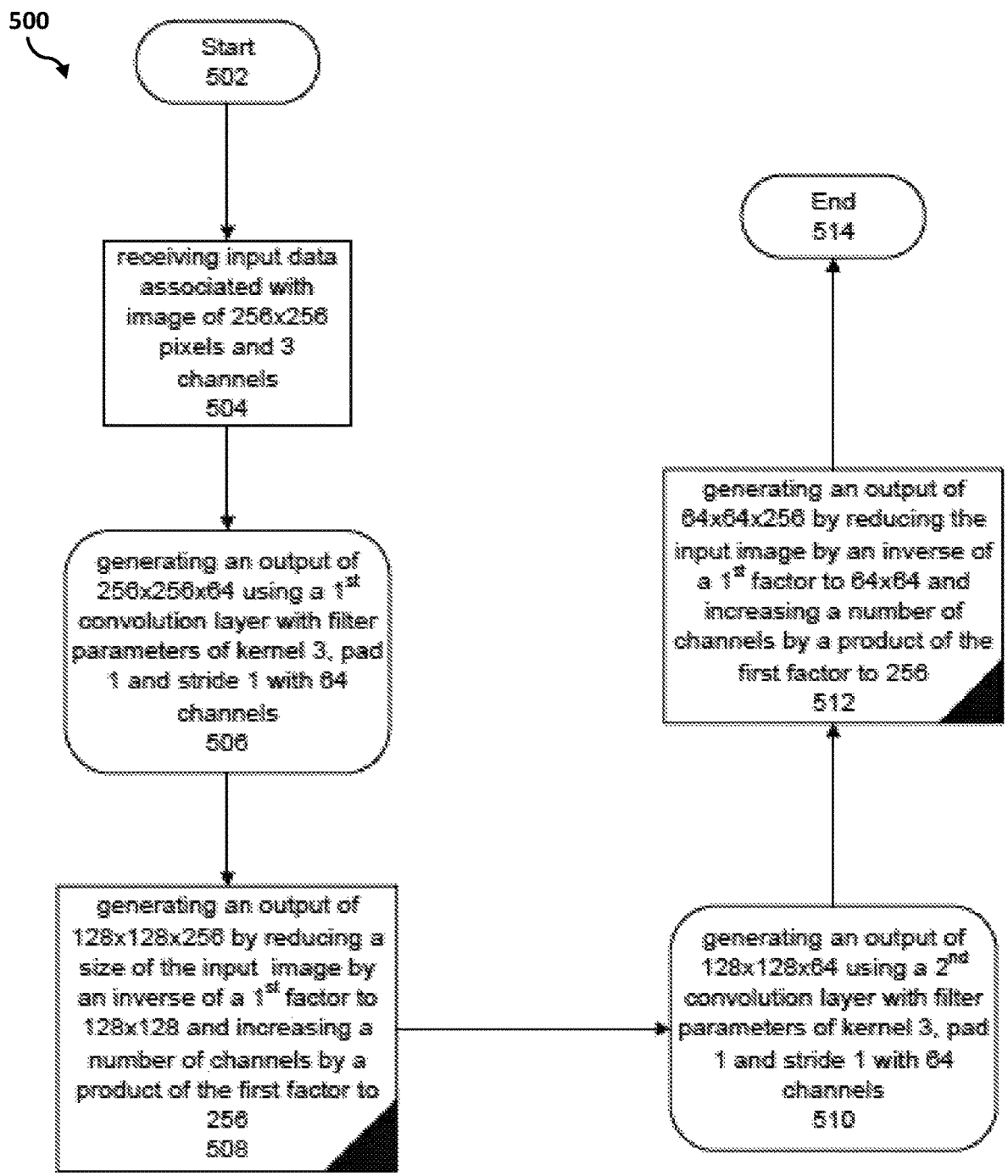
FIG. 5 is an operational flowchart illustrating an exemplary embodiment using a process of an enhanced convolutional neural network according to at least one embodiment.

FIG. 5 is a flow diagram of an example using a process of an enhanced convolutional neural network operable for various embodiments of the disclosure. Process 500 is a further example of processing digital data representing an input image using enhanced convolutional neural network 308 of FIG. 3.

Process 500 begins at 502. At 504, the process 500 commences by receiving input of digital data associated with an image comprising 256×256 pixels and 3 channels.

Then, at 506, the process 500 continues by generating an output of 256×256×64 using a first convolution layer with filter parameters of kernel 3, pad 1 and stride 1 with 64 channels. The output of 256×256×64 describes an image of a size of 256 units by 256 units. The units are typically pixels associated with the digital images. The number of channels is defined as 64. A value of kernel 3 indicates a filter size of 3 units by 3 units. The filter size defines an area being examined within an instance of an intermediate or hidden layer. A value of pad 1 indicates that an original image is bordered by a set of cells in which each cell is a single unit in width. The value of stride 1 indicates the filter, in this example a size of 3×3, will traverse the complete height and width of the input image using single unit increments to cover the whole area defined by the input image.

A convolutional neural network typically uses filter kernels having a size of 3 or 5. However, these kernels also have a limited power when shifting the digital data of the image. For example, using a 3×3 filter, the input can only be shifted relative to a previous location by 2 pixels per filter operation. Therefore, when input images have a small size, a few layers of a convolutional neural network may be used to typically produce a successful result. However, as a size of the input image becomes larger than 64×64, for example, the power of the convolutional neural network begins to diminish. As a result, many more layers or a greater number of channels is typically required with an associated increase in resource consumption and time taken.

Then at 508, the process 500 of an enhanced convolutional neural network continues further by generating an output of 128×128×256 by reducing a size of the input image from a size of 256 units by 256 units by an inverse of a first factor to 128×128 and increasing a number of channels by a second factor from 64 to 256. The input at 508 is the output at 506, in which the image size was 256 units by 256 units. As can be seen, the size of the image produced in at 506 is now reduced by half at 508. Therefore, the first factor is a value of 2, with a corresponding inverse of the first factor expressed as ½. The number of channels previously defined as 64 at 506 now becomes 256 at 508; therefore, the second factor is a value of 4. As a result, the processing at 508, which is not a convolution layer and does not apply filtering, rapidly changes the size of the image and the number of channels for processing. Although the image is repositioned, there is no addition or loss of data using this described process of enhanced convolutional neural network 308 of FIG. 3.

Then at 510, the process 500 continues by generating an output of 128×128×64 using a second convolution layer with filter parameters of kernel 3, pad 1 and stride 1 with 64 channels. The filter parameters remain the same as those at 506. Therefore, the input from 508 is now processed to become an output of 128×128×64. Although the image is repositioned, again there is no addition or loss of data using this described process of enhanced convolutional neural network 308 of FIG. 3.

Next at 512, the process 500 continues by generating an output of 64×64×256 by reducing the size of the input image by an inverse of a first factor to 64×64 and increasing a number of channels by a second factor to 256. Thereafter, at 514, the process 500 terminates.

Figure 6:
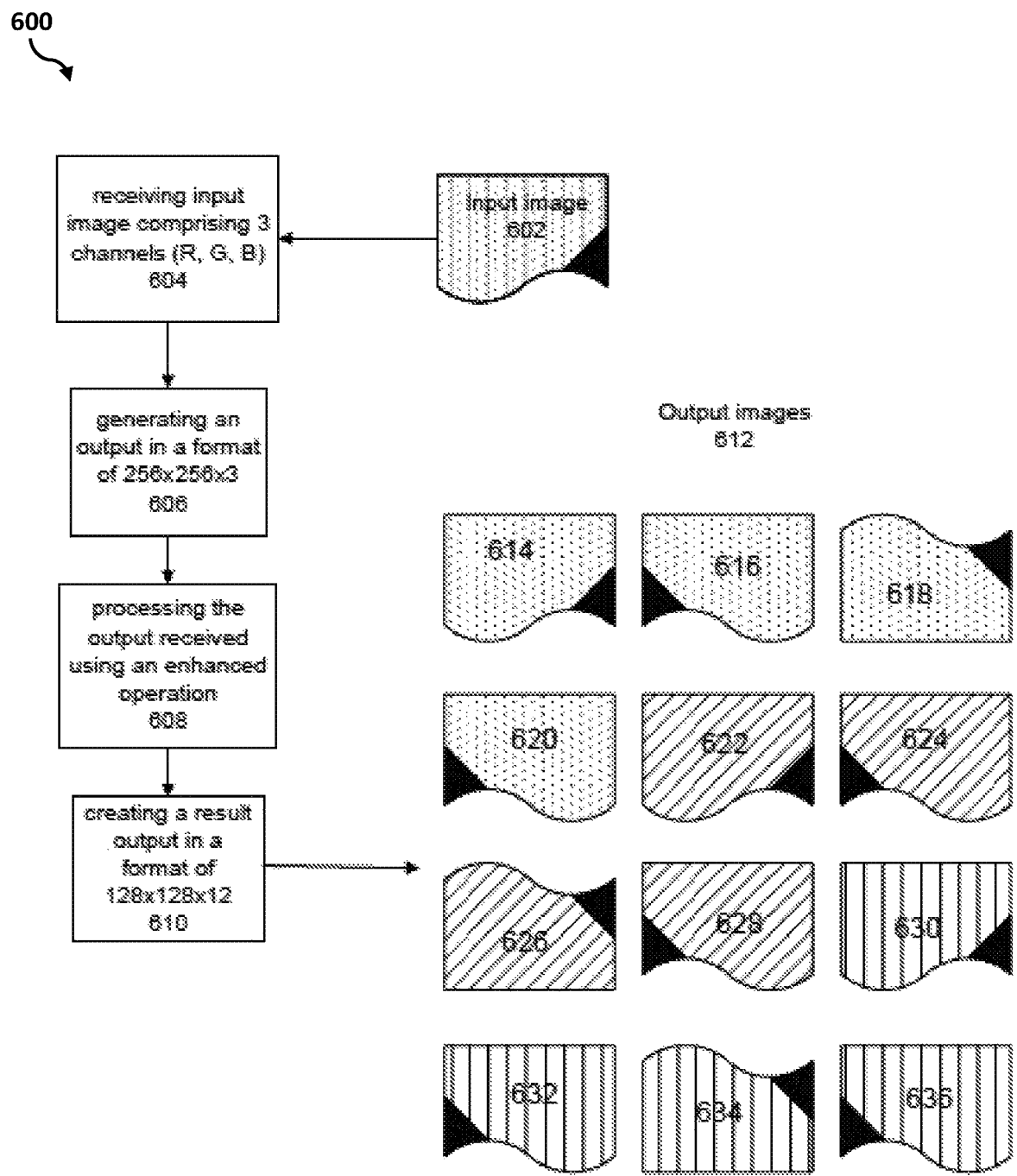
FIG. 6 is an operational flowchart illustrating another exemplary embodiment using a process of an enhanced convolutional neural network according to at least one embodiment.

FIG. 6 is a flow diagram of another example using a process of an enhanced convolutional neural network operable for various embodiments of the disclosure. Process 600 is a further example of processing digital data representing an input image using a process of enhanced convolutional neural network 308 of FIG. 3. Typical cell values range in value between 0 and 255 comprising a typical digital assignment by a computer of pixel values using a grey scale applied to the input image.

A dimensional of a layer, previously expressed as N×C×H×W, becomes in one embodiment of the disclosed method of down-sampling, in an enhanced convolutional neural network of the layer now expressed as N×(4*C)×(H/2)×(W/2). As a result, by applying this new expression, the dimension of the image is decreased by an inverse of a first factor, while a number of the channels is increased by a product of the first factor. In this example, the first factor value is 2 for each of the height and width; therefore, the dimension of the image is decreased by half, (inverse of 2) while the number of the channels is increased a factor of 4 (a product of 2×2 used in the height and width). Continuing this example, a first channel passes the input data to a next channel without any transformation. Each of the remaining channels passes the data by selectively performing one action selected from a group consisting of a mirroring action, a flipping action, and a rotating action to change image positions.

With reference to the above example, an input image is processed in the following manner of 256×256×3→OP→128×128×12. The number of channels in the output is therefore 4 times the number of channels in the input to maintain an equality of input to output as in 256×256×3=128×128×12. In general, the process may be expressed as the input through the process to output as in W×H×C→OP→(W/2)×(H/2)×(C*4), where OP is the enhanced operation as disclosed. Using another example including two operations, the expression now becomes W×H×C→OP→OP→(W/4)×(H/4)×(C*16). In this example OP is applied twice, but the number of pixels or data cells in the output and input remains the same. Therefore, using this example a general expression is stated in the form of W×H×C→OP→(W/n)×(H/m)×(C*m*n) while maintaining no data is added and no data is lost through the transformation.

In addition, neural networks also include use of a batch size, or a mini-batch size because typical processing does not process a single instance of an image or tensor. Instead the process usually operates on multiple images or tensors concurrently. Therefore, the general expression including batch size may be expressed as N×W×H×C→OP→N×(W/n)×(H/m)×(C*m*n). In this case the batch size N represents a quantity of input data to be processed, and m and n represent scaling factors to be used. As can be seen a reduction applied to the width and height of the input data using an inverse of n and m respectively, corresponds to an increase in the channels value by the product of n and m whereby the end result has no addition or loss of data as a result of the operation. In the examples, m and n are the same value and referred to as the first factor, but when applied to the channels are referred to as the product of the first factor. Tensor data that passes between neural network layers may also be expressed using the terms arranged in different formats as in (N×C×H×W), or (N×H×W×C) or any other format combination.

At 604, the process 600 begins by receiving an input image (input image 602); comprising 3 channels (R, G, B).

Then, at 606, the process 600 continues by generating an output in a format of 256×256×3. Then, at 608, the process 600 continues further by processing the output received using an enhanced operation. The enhanced operation of 608 is the processing described at 508 of FIG. 5. The dimensional now expressed as N×(4*C)×(H/2)×(W/2) is used at 608 of process 600 creating a result output at 610, in a format of 128×128×12. Output 612 is a set of images resulting from a set of fixed transforms applied using 608 of process 600.

Use of the set of fixed transforms, for example, using rotation and flip action typically reduces a computational load of a neural network optimizer and enables a faster flow of data from one side of the image to another side of the image. Output 612 represents a result of processing input image 602, which is a composite of R, G and B values into subsets consisting of separate R, G and B versions respectively as in images 614 through 636. For example, images 614 through 620 represent images of size 128×128 of original input image 602 resulting in an R channel view of an original orientation, a mirror orientation, a flip/mirror orientation and a flip orientation. In a similar manner, images 622 through 626 represent images of size 128×128 of original input image 602 resulting in a G channel view of an original orientation, a mirror orientation, a flip/mirror orientation and a flip orientation. In a similar manner, images 630 through 636 represent images of size 128×128 of original input image 602 resulting in a B channel view of an original orientation, a mirror orientation, a flip/mirror orientation and a flip orientation.

The resulting output shows a rapid transformation of input image 602 rather than a slower sequential iterative processing by traversing input image 602 in a stride of 1 typically used when using conventional convolutional filtering. Processing as described using 608 of process 600 does not use conventional convolutional filtering. Instead the processing at 608 is outside of and in addition to processing steps used in a conventional convolutional neural network. Therefore, process 600 represents a process using an enhanced conventional convolutional neural network as in enhanced convolutional neural network 308 of FIG. 3.

Figure 7:
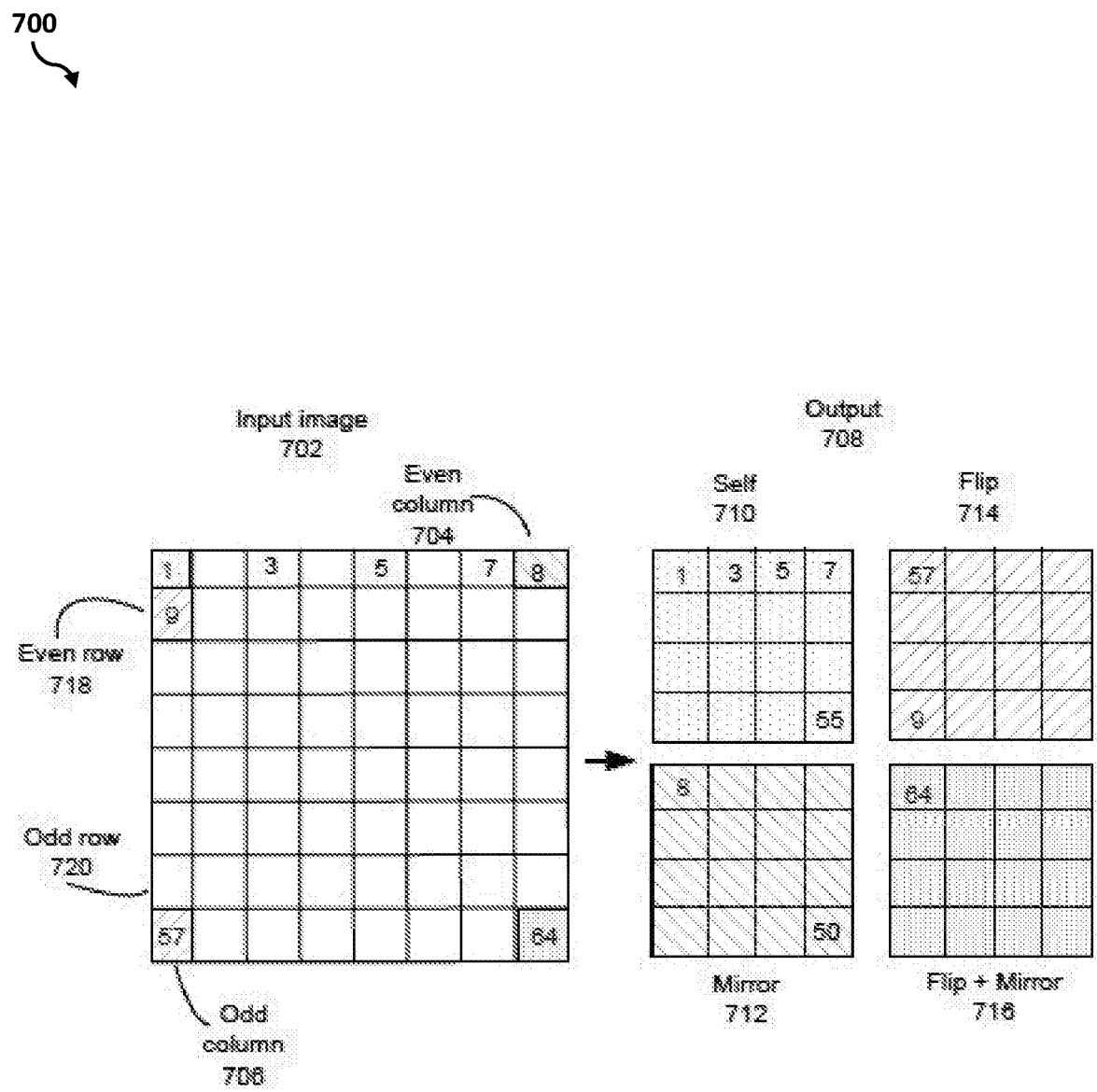
FIG. 7 is a block diagram illustrating another exemplary embodiment using a process of an enhanced convolutional neural network according to at least one embodiment.

FIG. 7 is a block diagram of another example using a process of an enhanced convolutional neural network operable for various embodiments of the disclosure. Process 700 provides a detailed view of processing using an enhanced convolutional neural network, for example, similar to that described using 608 of process 600 of FIG. 6.

In this example using process 700, input image 702 is segmented into an array of segments to form a grid layout. Cells in this example grid layout are conveniently numbered 1 through 64. The grid formed comprises an 8×8 layout. Therefore, a first column (top left of the grid) is numbered 1 and defines odd column 706. A last column (top right of the grid) and defines even column 704. Note that a column is not an odd or even column because of a value in a cell. Instead assignment as odd or even is due to a relative numeric position in a numbering sequence. In an analogous manner, rows can also be described as odd or even. For example, a second row from the top (has a cell value 9) and defines even row 718, while a second row from the bottom and defines odd row 720.

Output 708 includes four subsets of input image 702. Each subset represents a set of outputs corresponding to one of an original orientation as in self 710, a mirror orientation as in mirror 712, a flip/mirror orientation as in flip+mirror 716 and a flip orientation as in flip 714 of input image 702. Self 710 comprises values for cells selected from the intersection of the odd columns and the odd rows. Mirror 712 comprises values for cells selected from the intersection of the even columns and the odd rows. Flip 714 comprises values for cells selected from the intersection of the odd columns and the even rows. Flip+mirror 716 comprises values for cells selected from the intersection of the even columns and the even rows.

As in conventional convolutional neural network processing using back-propagation, phase gradients are propagated in a pixel-wise fashion and with a one-to-one mapping until they reach the original pixel position. Back-propagation is also used in the enhanced convolutional neural network described. As with a conventional convolutional neural network, the enhanced convolutional neural network described, also uses training of the multilayer neural network. In a feed forward phase data is processed using the inputs, as in the previous examples of image data, to generate an output of a final layer. During this feed forward phase one or more intermediate layers, typically referred to as hidden layers comprising convolutional layers are augmented with one or more new operations involving a modified down-sampling process in a multilayer enhanced convolutional neural network to more quickly map respective portions of an input image to form an output image.

A feedback phase of the enhanced convolutional neural network uses a computed error value generated when producing the mapping of the input image to an output image in the feed forward process. The computed error is then propagated backward, adjusting weights used in the convolutional filters in reverse order beginning from the final layer (output layer) to the first layer (input layer) through all hidden layers. Because enhancements in the enhanced convolutional neural network do not touch the convolutional filtering operations of the conventional convolutional neural network process, conventional back-propagation process provides ongoing adjustment to the enhanced convolutional neural network analogous to that of the conventional convolutional neural network.

Figure 8:
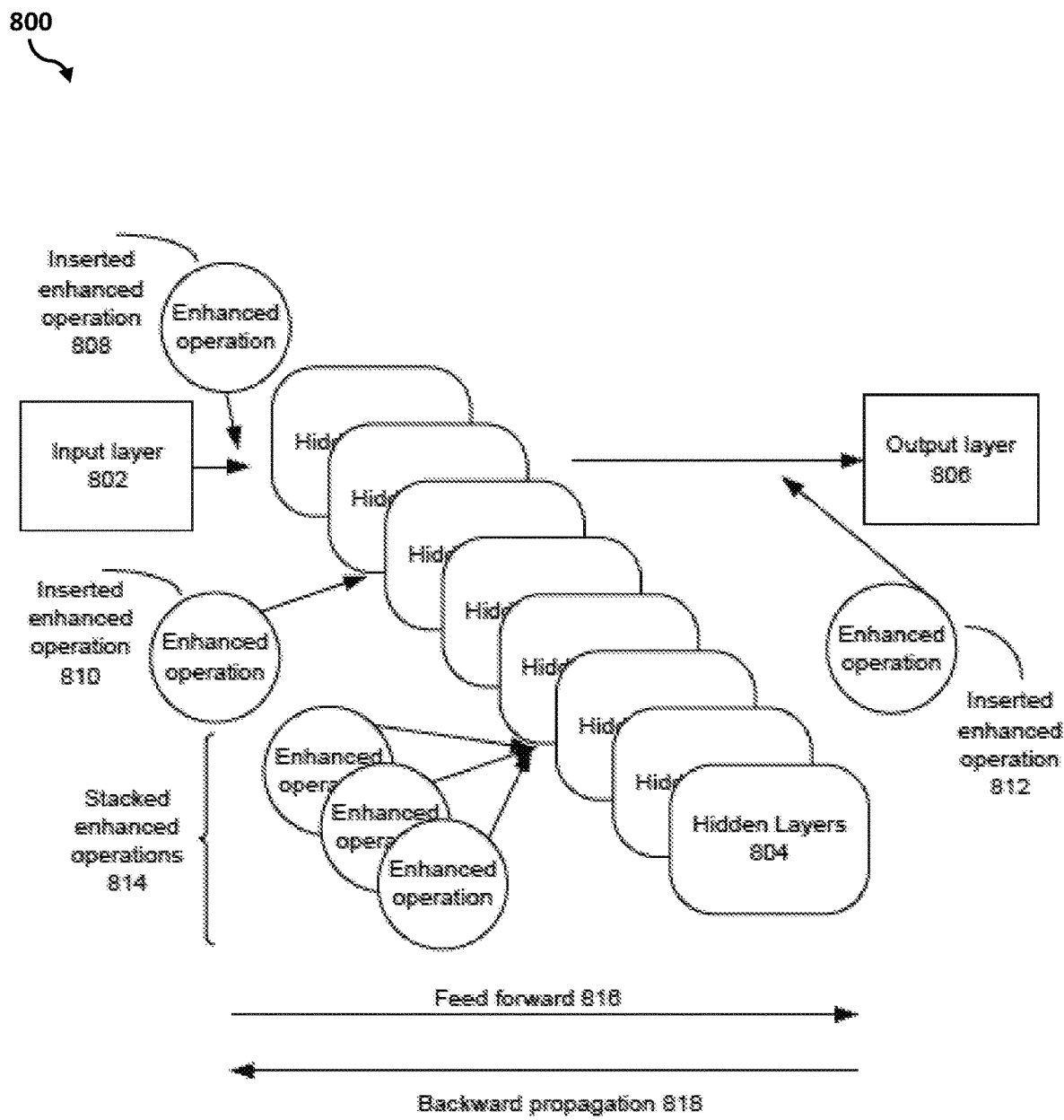
FIG. 8 is a block diagram of an enhanced convolutional neural network according to at least one embodiment.

FIG. 8 is a block diagram of an enhanced convolutional neural network operable for various embodiments of the disclosure. Enhanced convolutional neural network 800 includes multiple layers comprising input layer 802, one or more hidden or intermediate layers 804 and output layer 806. Although enhanced convolutional neural network 800 is shown with a single instance of input layer 802 and a single instance of output layer 806 a variation of enhanced convolutional neural network 800 may also include multiple instances of input layer 802 and multiple instances of output layer 806 without departing from the scope of the disclosure. For example, in one scenario there could be several of input layer 802 feeding input data through a set of hidden layers 804 into a result comprising several instances of output layer 806. As in previous examples, input layer 802 is a set of tensors that are passed between different layers in enhanced convolutional neural network 800.

Feed forward 816 indicates an initial phase of processing occurs in a forward direction using input from input layer 802, through processing by one or more hidden layers 804 to generate a result in output layer 806. An error generated during the initial phase, as a result of a lack of precision of processing parameters, is processed in a subsequent phase of backward propagation 818. Backward propagation 818 is a conventional process as used in conventional convolutional neural networks and is also used to tune enhanced convolutional neural network 800 enabling enhanced convolutional neural network 800 to learn from earlier processing of the initial phase. This type of error correction enables enhanced convolutional neural network 800 to improve the accuracy of results.

Inserted enhanced operation 808 represents an addition of the previously described enhanced operation to the usual sequence of processing typically found in convolutional neural networks to create enhanced convolutional neural network 800. Inserted enhanced operation 808 is shown between input layer 802 and hidden layers 804 (e.g., a first position). However, this operation can come between different layers (convolutional layers or any other) to transform two-dimensional data/tensors. In one variation, the enhanced operation is shown by placement of inserted enhanced operation 810 between two layers of hidden layers 804 (e.g., a second position). In another example, placement of inserted enhanced operation 812 is shown after hidden layers 804 and before output layer 806 (e.g., a third position).

Stacked enhanced operations 814 represents special down-sampling operations that are sequenced or stacked one after another and placed between layers of hidden layers 804. Therefore, in differing variations of enhanced convolutional neural network 800 there may be one or multiples of these special down-sampling operations, not only between different layers of the enhanced convolutional neural network 800 but also stacked back-to-back after one another.

Figure 9:
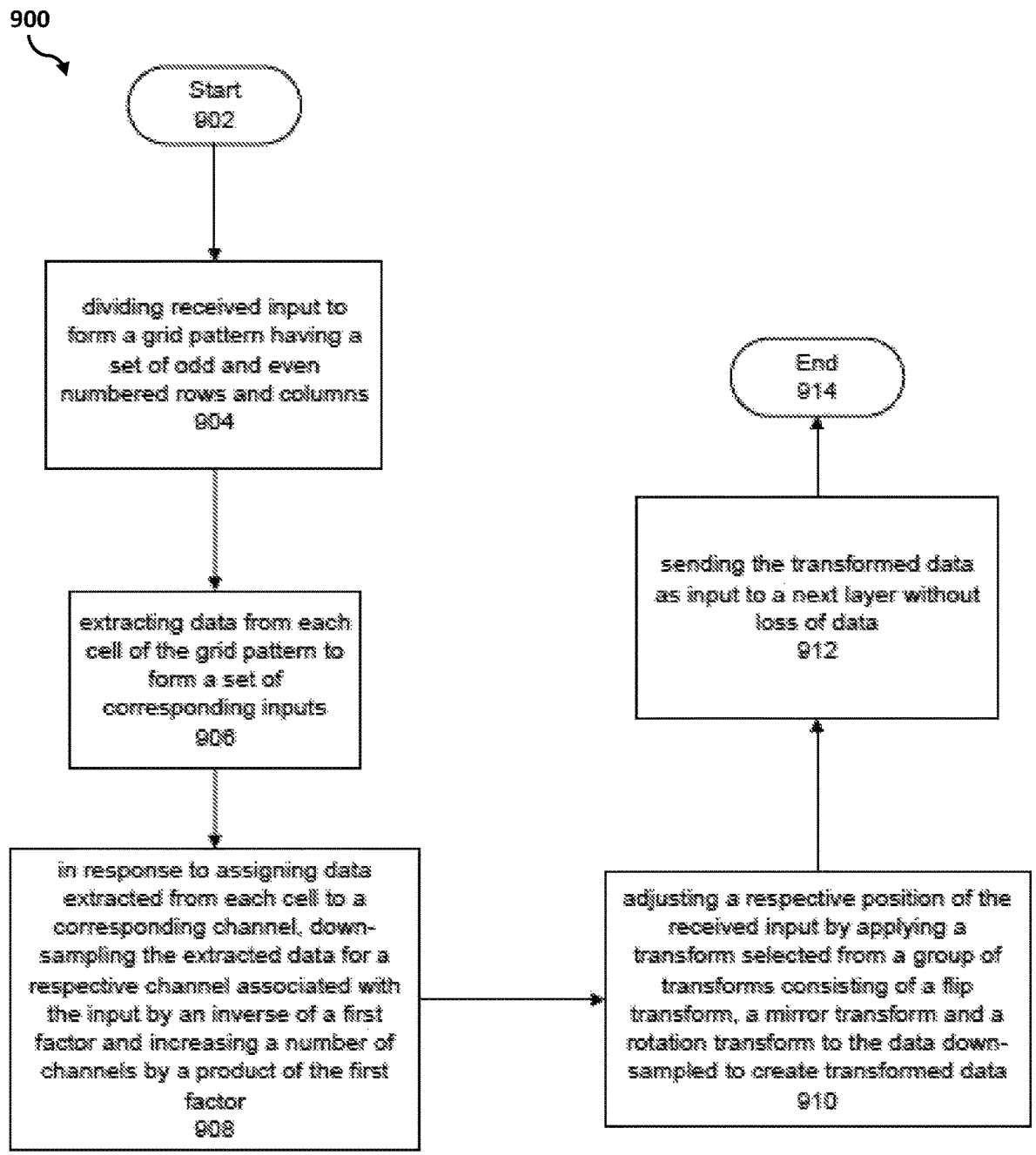
FIG. 9 is an operational flowchart illustrating a process for an enhanced convolutional neural network according to at least one embodiment.

FIG. 9 is a flow diagram of a process of an enhanced convolutional neural network operable for various embodiments of the disclosure. Process 900 is a high-level view of an example of processing digital data representing an input comprising two-dimensional data and using the enhanced convolutional neural network 308 of FIG. 3.

Process 900 begins at 902. At 904, the process 900 commences by dividing a received input to form a grid pattern having odd and even numbered rows and columns. The grid pattern formed ensures uniform coverage of the input using equal sized cells. The grid is further defined using a number of even numbered rows and odd numbered rows and even numbered columns and odd numbered columns. For example, the grid pattern may be numbered sequentially from left to right and top to bottom beginning at a top left position. Each cell in the grid has a respective numeric value associated with a respective digitized portion of the input image. However, this is only one example and is not meant to limit the scope of the disclosure to the embodiment described. The disclosed technique is used with a 2D tensor representative of digital data received as input. In one example, the digital data received as input may represent a digital image, while in another example the digital data may represent a set of monitor data, for a process, received in tabular form and used to determine a path selection to control a subsequent process in an industrial operation. The grid may also be referred to as an array.

Then, at 906, the process 900 continues by extracting data from each cell of the grid pattern to form a set of corresponding inputs. The set of corresponding inputs comprises respective individual values of each cell.

Then, at 908, in response to assigning the data extracted from each cell to a corresponding channel, the process 900 performs down-sampling of the extracted data, for a respective channel, associated with the input by an inverse of a first factor and increasing a number of channels by a product of the first factor. This sub-process of the enhanced convolutional neural network causes the size of each dimension of the input image to be reduced by the inverse of the first factor while the number of channels is increased by the product of the first factor. As described previously with reference to FIG. 6, a reduction is applied to the width and height of the input data using an inverse of n and m respectively (the first factor). A corresponding increase in the channels value is therefore calculated as the product of n and m whereby the end result has no addition or loss of data as a result of the operation. In the examples, m and n are the same value and referred to as the $1^{st}$ factor, but when applied to the channels are referred to as the product of the first factor. However, no data is added or removed as a result of the operation.

Then, at 910, the process 900 continues by adjusting a position of the received input by applying a transform selected from a group of transforms consisting of a flip transform, a mirror transform, and a rotation transform to the data down-sampled to create transformed data. Filters of a next layer use this transformed data readily available to their benefit. Application of a selected transform operation rapidly changes positioning of the data relative to that of the input data received as shown in the previously described examples of FIG. 6 and FIG. 7. This rapid change in positioning of the data is in contrast with respect to earlier prior convolutional neural networks that gradually changed data positioning using a number of iterations in a combination of many gradients. However, prior down-sampling methods typically did not change position of the data being processed. As a result, the only option typically available when using the prior implemented convolutional neural networks was to shift data using only convolutional filters.

Then, at 912, the process 900 continues further by sending the transformed data as input to a next hidden or intermediate layer without addition or loss of data. Then, at 914, the process 900 terminates. Although the data is repositioned rapidly, there is no addition or loss of data using this described process of enhanced convolutional neural network 308 of FIG. 3.

Thus, one embodiment of a computer-implemented method for a down-sampling operation for a convolutional neural network is described herein. The computer-implemented process comprises dividing received input to form a grid pattern having a set of odd and even numbered rows and columns. Data is extracted from each cell of the grid pattern to form a set of corresponding inputs. In response to assigning data extracted from each cell to a corresponding channel, down-sampling of the extracted data for a respective channel associated with the input is performed using an inverse of a first factor and increasing a number of the channels by a product of the first factor. A respective position of the received input is adjusted by applying a transform selected from a group of transforms consisting of a flip transform, a mirror transform, and a rotation transform to the data down-sampled to create transformed data. The transformed data is sent as input to a next layer without addition or loss of data.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A method for a down-sampling operation for a convolutional neural network, the method comprising:
   dividing a received input into a plurality of cells to form a grid pattern including a set of odd numbered rows and columns and a set of even numbered rows and columns;
   extracting at least one data from each cell of a plurality of cells of the formed grid pattern to form a set of corresponding inputs;
   in response to assigning the at least one extracted data from each cell of the plurality of cells to a corresponding channel, down-sampling the at least one extracted data for a respective channel associated with the received input by an inverse of a first factor and increasing a number of channels by a product of the first factor;
   adjusting a respective position of the received input by applying a transform selected from the group consisting of: a flip transform, a mirror transform, and a rotation transform to the at least one down-sampled data to create at least one transformed data;
   sending the at least one transformed data as an input to a next layer without at least one additional data or at least one lost data; and
   propagating an error computed in a feed forward phase, using a back-propagation phase, using a one-to-one mapping until an original position is attained.

2. The method of claim 1, wherein down-sampling the at least one extracted data for the respective channel associated with the received input by the inverse of the first factor and increasing the number of channels by the product of the first factor further comprises: down-sampling the received input using the first factor to create the at least one down-sampled data, wherein at least one dimension of the received input decreases by the first factor including a n value and a m value expressed as (W/n)×(H/m), wherein W is width and H is height; and increasing the number of channels by the product of the first factor expressed as (C*m*n), wherein C is channel and wherein a general expression for an enhanced operation OP including a batch size N is expressed as N×W×H×C≥OP≥N×(W/n)×(H/m)×(C*m*n).

3. The method of claim 1, further comprising:
   passing the received input data by a first channel to a next channel without any transformation.

4. The method of claim 1, wherein adjusting further comprises:
   applying a predetermined transform to the at least one down-sampled data to move at least one information within the received input in preparation for the next layer of the convolutional neural network, wherein all of the at least one information is maintained.

5. The method of claim 1, wherein a first factor value of the first factor is 2 and a product value of the first factor is 4.

6. The method of claim 1, wherein the down-sampling and the adjusting are included in an enhanced operation located in a position selected from the group consisting of: a first position that is after an input layer and before a hidden layer, a second position that is between a first hidden layer and a second hidden layer, and a third position that is after the hidden layer but prior to an output layer.

7. The method of claim 1, wherein the down-sampling and the adjusting are included in a set of enhanced operations forming an enhanced operations stack, wherein the enhanced operations stack is located in a position selected from the group consisting of: a first position that is after an input layer and before a hidden layer, a second position that is between a first hidden layer and a second hidden layer, and a third position that is after the hidden layer but prior to an output layer.

8. The method of claim 1, further comprising:
   providing a digital image in the received input; and
   propagating the error computed in the feed forward phase, using the back-propagation phase in a pixel-wise manner using the one-to-one mapping until the original position is attained.

9. A computer system for a down-sampling operation for a convolutional neural network, comprising:
   one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
- dividing a received input into a plurality of cells to form a grid pattern including a set of odd numbered rows and columns and a set of even numbered rows and columns;
- extracting at least one data from each cell of a plurality of cells of the formed grid pattern to form a set of corresponding inputs;
- in response to assigning the at least one extracted data from each cell of the plurality of cells to a corresponding channel, down-sampling the at least one extracted data for a respective channel associated with the received input by an inverse of a first factor and increasing a number of channels by a product of the first factor;
- adjusting a respective position of the received input by applying a transform selected from the group consisting of: a flip transform, a mirror transform, and a rotation transform to the at least one down-sampled data to create at least one transformed data;
- sending the at least one transformed data as an input to a next layer without at least one additional data or at least one lost data; and
- propagating an error computed in a feed forward phase, using a back-propagation phase, using a one-to-one mapping until an original position is attained.

10. The system of claim 9, wherein down-sampling the at least one extracted data for the respective channel associated with the received input by the inverse of the first factor and increasing the number of channels by the product of the first factor further comprises: down-sampling the received input using the first factor to create the at least one down-sampled data, wherein at least one dimension of the received input decreases by the first factor including a n value and a m value expressed as $(W/n) \times (H/m)$, wherein W is width and H is height; and increasing the number of channels by the product of the first factor expressed as $(C*m*n)$, wherein C is channel and wherein a general expression for an enhanced operation OP including a batch size N is expressed as $N \times W \times H \times C \rightarrow OP \rightarrow N \times (W/n) \times (H/m) \times (C*m*n)$.

11. The system of claim 9, further comprising:
passing the received input data by a first channel to a next channel without any transformation.

12. The system of claim 9, wherein adjusting further comprises:
applying a predetermined transform to the at least one down-sampled data to move at least one information within the received input in preparation for the next layer of the convolutional neural network, wherein all of the at least one information is maintained.

13. The system of claim 9, wherein a first factor value of the first factor is 2 and a product value of the first factor is 4.

14. The system of claim 9, wherein the down-sampling and the adjusting are included in an enhanced operation located in a position selected from the group consisting of: a first position that is after an input layer and before a hidden layer, a second position that is between a first hidden layer and a second hidden layer, and a third position that is after the hidden layer but prior to an output layer.

15. The system of claim 9, wherein the down-sampling and the adjusting are included in a set of enhanced operations forming an enhanced operations stack, wherein the enhanced operations stack is located in a position selected from the group consisting of: a first position that is after an input layer and before a hidden layer, a second position that is between a first hidden layer and a second hidden layer, and a third position that is after the hidden layer but prior to an output layer.

16. The system of claim 9, further comprising:
providing a digital image in the received input; and
propagating the error computed in the feed forward phase, using the back-propagation phase in a pixel-wise manner using the one-to-one mapping until the original position is attained.

17. A computer program product for a down-sampling operation for a convolutional neural network, comprising:
one or more computer-readable tangible storage media and program instructions stored on at least one of the one or more computer-readable tangible storage media, the program instructions executable by a processor to cause the processor to perform a method comprising:
- dividing a received input into a plurality of cells to form a grid pattern including a set of odd numbered rows and columns and a set of even numbered rows and columns;
- extracting at least one data from each cell of a plurality of cells of the formed grid pattern to form a set of corresponding inputs;
- in response to assigning the at least one extracted data from each cell of the plurality of cells to a corresponding channel, down-sampling the at least one extracted data for a respective channel associated with the received input by an inverse of a first factor and increasing a number of channels by a product of the first factor;
- adjusting a respective position of the received input by applying a transform selected from the group consisting of: a flip transform, a mirror transform, and a rotation transform to the at least one down-sampled data to create at least one transformed data;
- sending the at least one transformed data as an input to a next layer without at least one additional data or at least one lost data; and
- propagating an error computed in a feed forward phase, using a back-propagation phase, using a one-to-one mapping until an original position is attained.

18. The computer program product of claim 17, wherein down-sampling the at least one extracted data for the respective channel associated with the received input by the inverse of the first factor and increasing the number of channels by the product of the first factor further comprises: down-sampling the received input using the first factor to create the at least one down-sampled data, wherein at least one dimension of the received input decreases by the first factor including a n value and a m value expressed as $(W/n) \times (H/m)$, wherein W is width and H is height; and increasing the number of channels by the product of the first factor expressed as $(C*m*n)$, wherein C is channel and wherein a general expression for an enhanced operation OP including a batch size N is expressed as $N \times W \times H \times C \rightarrow OP \rightarrow N \times (W/n) \times (H/m) \times (C*m*n)$.

* * * * *